United States Patent [19]

Kieser

[11] Patent Number: 4,540,730

[45] Date of Patent: Sep. 10, 1985

[54] PROCESS FOR INCORPORATING PIGMENTS INTO THERMOPLASTICS, AND ADHESION PROMOTERS FOR USE IN THIS PROCESS

[75] Inventor: Manfred Kieser, Darmstadt, Fed. Rep. of Germany

[73] Assignee: Merck Patent Gesellschaft mit beschränkter Haftung, Darmstadt, Fed. Rep. of Germany

[21] Appl. No.: 501,302

[22] Filed: Jun. 6, 1983

[30] Foreign Application Priority Data

Jun. 4, 1982 [DE] Fed. Rep. of Germany ....... 3221044

[51] Int. Cl.$^3$ .............................................. C08K 5/20
[52] U.S. Cl. .................................... 524/230; 524/231; 524/232; 524/241; 524/251; 524/317; 524/376; 524/377; 524/378; 524/385
[58] Field of Search ............... 524/230, 251, 241, 231, 524/232, 317, 376, 377, 378, 385

[56] References Cited

U.S. PATENT DOCUMENTS

| | | | |
|---|---|---|---|
| 2,548,433 | 4/1951 | Klein et al. | 524/251 |
| 2,938,879 | 5/1960 | Mock et al. | 524/230 |
| 3,385,804 | 5/1968 | Hill, Jr. | 524/230 |
| 3,407,166 | 10/1968 | Kuceski et al. | 524/230 |
| 3,409,580 | 11/1968 | Alzwar et al. | 524/251 |
| 3,468,840 | 9/1969 | Heiberger et al. | 524/230 |
| 3,471,426 | 10/1969 | Hofton | 524/251 |
| 4,129,717 | 12/1978 | Praetorius et al. | 524/230 |

OTHER PUBLICATIONS

Encyclopedia of Chemical Technology, 3rd Ed., vol. 18, pp. 138–139.

*Primary Examiner*—Joseph L. Schofer
*Assistant Examiner*—N. Sarofim
*Attorney, Agent, or Firm*—Millen & White

[57] ABSTRACT

An adhesion promoter for use in incorporating pigments into thermoplastics, contains an organic solvent for and compatible with the polymer and a surfactant stable under the temperatures of the operating conditions used to shape the composition. It can be employed, in particular, when incorporating pearlescent pigments.

9 Claims, No Drawings

PROCESS FOR INCORPORATING PIGMENTS INTO THERMOPLASTICS, AND ADHESION PROMOTERS FOR USE IN THIS PROCESS

BACKGROUND OF THE INVENTION

The present invention relates to adhesion promoters which are used to incorporate pigments into thermoplastics.

It is known that, when pigmenting granulated thermoplastics which are processed, for example, in injection molding machines or extruders to give pigmented shaped articles, adhesion promoters are added to the mixture. These additives are intended in particular to effect a uniform distribution of the pigments in the plastic melt.

Particularly in the case of pearlescent pigments based on mica flakes coated with metal oxides, in particular titanium dioxide, which are frequently employed for pigmenting thermoplastics, difficulties often arise because the hydrophilic pigment aggregates are difficult to disperse into the highly viscous plastic melts, which in most cases are non-polar. There results a non-uniform distribution of the pigments in the plastics which have been extruded, injection molded or processed in other ways.

The addition of low-molecular weight polyethylene wax is recommended in DE-A No. 2,258,729 in order to improve the incorporation process. Although this additive effects a reduction in the viscosity of the medium primarily enveloping the pigment particles, at the same time the polarity of the latter becomes even lower, so that the remaining effect is only a slight improvement.

It has also been suggested to add a solvent which acts as a plasticizer for the plastic to the mixture of pigment/plastic granules. However, in this procedure too, numerous pigment agglomerates can be seen after processing, even with the naked eye.

Because the pigmentation is unsatisfactory in these respects, the pigments have, therefore, frequently been employed in the form of a master batch or a pre-granulation has been carried out before the actual processing to give shaped articles. Pigment/plastic mixtures are processed via an extruding/granulating machine to give pigmented granules and these granules are then shaped, for example by the injection molding process.

However, both the preparation of a master batch and pre-granulation constitute a considerable further outlay of time and equipment capacity, and this considerably increases the cost of production.

There is, therefore, a need for an improved process.

SUMMARY OF THE INVENTION

Accordingly, it is an object of this invention to eliminate or ameliorate these disadvantages of the prior art.

Upon further study of the specification and appended claims, further objects and advantages of this invention will become apparent to those skilled in the art.

These objects have been achieved based, e.g., on the surprising finding that the addition of a small amount of a surfactant to the solvents already used as adhesion promoters effects a considerable improvement in the incorporability of pigments in the polymers.

This invention relates, therefore, to an adhesion promoter for use when incorporating pigments into thermoplastics, which comprises an organic solvent compatible with the polymer and a surfactant stable under the temperatures of the operating conditions, e.g., of the extrusion and/or the molding processes.

This invention relates to a process for incorporating pigments into thermoplastics, in which granules of plastic are mixed with the pigment and the mixture is then shaped by the application of heat, comprising adding to the granules an adhesion promoter containing an organic solvent compatible with the polymer and a surfactant stable under the temnperatures of the operating conditions.

DETAILED DISCUSSION

A principal advantage of the present invention is that a homogeneous distribution in a thermoplastic of even the finest pigments having a strong tendency to agglomeration, is now achieved without a master batch and without pre-granulation by using the adhesion promoter and the process according to this invention.

The solvents which are customarily used as plasticizers for plastics can be used as the organic solvents which are compatible wth polymers as required by this invention. These include, for example, esters of phthalic acid with linear, branched or cyclic aliphatic alcohols having up to 12 C atoms, such as, for example, dioctyl phthalate(di-2-ethylhexyl phthalate), diisononyl phthalate, diisodecyl phthalate, dibutyl phthalate, diisobutyl phthalate and dicyclohexyl phthalate, esters of aliphatic dicarboxylic acids, such as, for example, esters of adipic, sebacic or azelaic acid, esters of fatty acids, citric acid esters and other plasticizers, such as are mentioned, for example, in Kirk-Othmer, volume 15, pages 720 to 789. It is preferred to use phthalic acid esters and, particularly, dioctyl phthalate. Mixtures of different plasticizers can also be employed.

Suitable surfactants include, in principle, all anionic, cationic, ampholytic and nonionic surfactants which, on the one hand, are compatible with the particular plastic and the solvent, and, on the other hand, are stable under the processing conditions, i.e., in particular, which withstand elevated temperatures of, for example, 200° to 300° C., i.e, which maintain their structural integrity under such processing conditions.

It is preferred to use nonionic surfactants, such as, for example, polyethers, especially alkylphenol polyglycol ethers, ethoxylation products of fatty acids, fatty acid amides, fatty amines and fatty alcohols, amine oxides and fatty acid esters of polyalcohols, in particular sugar alcohols, and ethoxylation products thereof.

As a rule, the surfactants are added in quantities of 0.1–5% by weight in relation to the amount of plasticizer; quantities of 1 to 3% by weight, in particular, have proved beneficial. Generally, the plasticizer and the surfactant are the only essential components in the adhesion promoter of this invention.

The adhesion promoter thus obtained is added in turn to the pigment/plastic granules mixture in a quantity of about 0.05 to 2% by weight of the granules mixture, in particular about 0.2 to 1% by weight.

The adhesion promoters according to this invention enable, in principle, the incorporation of all types of pigments and related products, such as, for example, fillers or other additives, into thermoplastics. The use of the adhesion promoters according to this invention is particularly applicable in the case of pigments which have a strong tendency to agglomeration, in particular finely divided pigments. In particular, by virtue of their platelet-like shape, pearlescent pigments based on mica flakes coated with metal oxides, and of these particularly the finely divided varieties, also have a strong tendency to agglomeration so that a preferred application of the invention relates to the incorporation of pigments of this type.

The preparation of the mixture of pigment/plastic granules is generally effected by initially taking the plastic granules in a suitable mixer and wetting them with the adhesion promoter and then adding the pigment and intermixing the components, for example for a few minutes.

The mixture thus obtained can then be processed directly in an extruder or an injection molding machine. The shaped articles formed in processing exhibit a very homogeneous distribution of the pigment, and it is scarcely possible still to see agglomerates of pigment, even when a very critical observation is made.

A very valuable contribution toward the processing of pigments in thermoplastics is therefore provided by this invention.

Unless indicated otherwise herein all details of the use of the adhesion promoter of this invention are fully conventional, e.g., kinds and amounts of pigments, solvents, thermoplastic polymers, etc.; processing methods and conditions; etc.; e.g., as disclosed in Ullmann, Enzyklopädie der technischen Chemie, Vol. 15, page 275 and following (1978).

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

1 kg of polystyrene granules is uniformly wetted with a 2% solution of polyoxyethylenesorbitan monooleate in dioctyl phthalate in an eccentric tumbling mixer, and 10 g of a $TiO_2$-mica pearlescent pigment having a particle size of 10 to 50 μm is added. After mixing for 2 minutes, the granules are processed in an injection molded machine to give small sheets. Even when observed very critically, it is scarcely possible still to see agglomerates of pigment in the finished injection molding. The pearlescent luster is very good and homogeneous.

COMPARATIVE EXAMPLE 1(a)

The process is carried out analogously to Example 1, but 5 g of pure dioctyl phthalate or 5 g of a 9:1 dioctyl phthalate/butyl glycollate mixture is used as the adhesion promoter. After these granules have been injection molded on an injection molding machine, a large number of pigment agglomerates can be detected with the naked eye in the finished injection molding.

COMPARATIVE EXAMPLE 1(b)

A pigment/plastic granules mixture is prepared similarly to Example 1(a). These granules are pregranulated via an extruding/granulating machine and only then are injection molded on an injection molding machine to give small sheets. Markedly fewer pigment agglomerates are visible in the injection molding than in the case of Example 1(a), but the result is inferior to that of Example 1.

EXAMPLE 2

The process is carried out analogously to Example 1, but a 5% solution of polyoxyethylenesorbitan monooleate in dioctyl phthalate is used as the adhesion promoter. The finished injection molding exhibits a very good pearlescent luster and hardly any pigment agglomerates.

EXAMPLE 3

The process is carried out as in Example 1, but 10 g of a very finely divided $TiO_2$-mica pearlescent pigment having a particle size of not more than 10 μm is used as the pigment. Even when this very finely divided pigment is used, the finished injection molding exhibits hardly any pigment agglomerates and has a very good pearlescent luster.

COMPARATIVE EXAMPLE 3(b)

Processing the same pigment in accordance with the process of Example 1(b), using pure dioctyl phthalate as the adhesion promoter, results in an unsatisfactory distribution of the pigment, with numerous agglomerates, in spite of the mixture being pre-granulated.

The preceding examples can be repeated with similar success by substituting the generically or specifically described reactants and/or operating conditions of this invention for those used in the preceding examples. From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for incorporating a pigment into a thermoplastic polymer, comprising mixing granules of the polymer, an adhesion promoter and the pigment whereby said mixture is treatable under high temperature operating conditions, the improvement wherein about 0.05 to 2% by weight of the adhesion promoter, based on the weight of polymer and pigment, is added in said mixture and wherein the adhesion promoter consists essentially of 95–99.9% by weight of an organic solvent compatible with the polymer and which is a plasticizer therefor and 0.1–5% by weight of a surfactant which is structurally stable under said high temperature operating conditions.

2. A process of claim 1 wherein the solvent is dioctyl phthalate.

3. A process of claim 1 wherein the surfactant is a polyether, an ethoxylation product of a fatty acid, a fatty acid amide, a fatty amine or a fatty alcohol; an amine or a fatty acid ester of a polyalcohol.

4. A process of claim 1 wherein the pigment is a mica flake pigment coated with a metal oxide.

5. A process of claim 1 wherein the adhesion promoter comprises, as the solvent, a phthalic acid ester and, as the surfactant, a nonionic surfactant.

6. A process of claim 1 further comprising shaping the mixture of polymer and pigment under the influence of heat.

7. A process of claim 2 wherein the shaping step is effected at 200°–300° C.

8. A process for incorporating a pigment into a thermoplastic polymer of claim 1 wherein the adhesion promoter consists essentially of 0.1–3% by weight of the surfactant.

9. A process for incorporating a pigment into a thermoplastic polymer of claim 1 wherein the amount of adhesion promoter is about 0.05 to 1% by weight.

* * * * *